United States Patent
Nelson et al.

(10) Patent No.: US 10,104,839 B2
(45) Date of Patent: Oct. 23, 2018

(54) LINKAGE FOR AGRICULTURAL HARVESTER CLEANER

(71) Applicant: CNH Industrial America LLC, New Holland, PA (US)

(72) Inventors: Tyler L. Nelson, Rochester, MN (US); Craig E. Murray, Davenport, IA (US); Curtis F. Hillen, Lititz, PA (US); Clay A. Reinecke, Blue Grass, IA (US); Kevin S. Schwinn, Orion, IL (US)

(73) Assignee: CNH Industrial America LLC, New Holland, PA (US)

( * ) Notice: Subject to any disclaimer, the term of this patent is extended or adjusted under 35 U.S.C. 154(b) by 78 days.

(21) Appl. No.: 15/218,187

(22) Filed: Jul. 25, 2016

(65) Prior Publication Data

US 2017/0020073 A1    Jan. 26, 2017

Related U.S. Application Data

(60) Provisional application No. 62/196,083, filed on Jul. 23, 2015.

(51) Int. Cl.
| | |
|---|---|
| A01F 12/32 | (2006.01) |
| B07B 1/00 | (2006.01) |
| A01F 12/44 | (2006.01) |
| A01D 41/12 | (2006.01) |
| A01F 7/06 | (2006.01) |
| A01F 12/46 | (2006.01) |
| A01F 12/60 | (2006.01) |

(52) U.S. Cl.
CPC .......... *A01F 12/448* (2013.01); *A01F 12/446* (2013.01); *A01D 41/12* (2013.01); *A01F 7/06* (2013.01); *A01F 12/444* (2013.01); *A01F 12/46* (2013.01); *A01F 12/60* (2013.01)

(58) Field of Classification Search
CPC ...... A01F 12/446; A01F 12/448; A01F 12/44; A01F 12/56; B07B 1/28; B07B 1/42; A01D 75/282
See application file for complete search history.

(56) References Cited

U.S. PATENT DOCUMENTS

| | | | | |
|---|---|---|---|---|
| 2,939,581 A * | 6/1960 | Ashton | .................... | A01F 12/44 209/26 |
| 4,355,647 A * | 10/1982 | Heidjann | ............. | A01D 75/282 460/101 |

(Continued)

FOREIGN PATENT DOCUMENTS

| | | |
|---|---|---|
| EP | 2145530 A2 | 1/2010 |
| EP | 2941948 A1 | 11/2015 |
| GB | 2146218 A | 4/1985 |

OTHER PUBLICATIONS

European Search Report; 16181011.4-1656; dated Nov. 28, 2016.

*Primary Examiner* — Arpad Fabian-Kovacs
(74) *Attorney, Agent, or Firm* — Patrick M. Sheldrake

(57) ABSTRACT

An agricultural harvester includes a grain processing section having a sieve. The sieve is driven in fore and aft oscillation while permitting side to side movement by a pair of cast members interconnected each having three mounting points. Two of the mounting points of the members are interconnected by flexible rubber bushings and the third mounting point of one of the members receives fore and aft oscillating movement and the third mounting point on the second of the members pivotally interconnects to the sieve to drive it into fore and aft oscillation while permitting side to side movement.

16 Claims, 4 Drawing Sheets

(56) References Cited

U.S. PATENT DOCUMENTS

| | | | | |
|---|---|---|---|---|
| 4,598,718 | A * | 7/1986 | Glaubitz | A01D 75/282 |
| | | | | 209/416 |
| 4,770,190 | A * | 9/1988 | Barnett | A01F 12/446 |
| | | | | 209/394 |
| 7,322,882 | B2 | 1/2008 | Duquesne et al. | |
| 8,118,649 | B1 * | 2/2012 | Murray | A01F 12/28 |
| | | | | 460/4 |
| 8,951,105 | B2 | 2/2015 | Murray et al. | |
| 9,693,506 | B2 * | 7/2017 | De Smet | A01F 12/32 |
| 2002/0195377 | A1 * | 12/2002 | Trench | B07B 1/284 |
| | | | | 209/365.1 |
| 2003/0186731 | A1 * | 10/2003 | Voss | A01F 12/448 |
| | | | | 460/101 |
| 2005/0282601 | A1 * | 12/2005 | Duquesne | A01D 75/282 |
| | | | | 460/101 |
| 2006/0249219 | A1 * | 11/2006 | Vanderjeugt | D03C 3/36 |
| | | | | 139/87 |
| 2008/0004092 | A1 * | 1/2008 | Nelson | A01F 12/448 |
| | | | | 460/101 |
| 2008/0318650 | A1 * | 12/2008 | Dhont | A01D 75/282 |
| | | | | 460/101 |
| 2014/0162737 | A1 * | 6/2014 | Stan | A01F 12/444 |
| | | | | 460/1 |
| 2014/0171163 | A1 * | 6/2014 | Murray | A01F 12/448 |
| | | | | 460/101 |
| 2015/0087364 | A1 * | 3/2015 | Adamson | A01F 12/446 |
| | | | | 460/79 |
| 2015/0087365 | A1 * | 3/2015 | Pearson | A01F 12/446 |
| | | | | 460/93 |
| 2015/0296713 | A1 | 10/2015 | Moutton | |
| 2015/0305243 | A1 | 10/2015 | Duquesne et al. | |

\* cited by examiner

LINKAGE FOR AGRICULTURAL HARVESTER CLEANER

This is a non-provisional application based upon U.S. provisional patent application Ser. No. 62/196,083, entitled "LINKAGE FOR AGRICULTURAL HARVESTER CLEANER", filed Jul. 23, 2015, which is incorporated herein by reference.

BACKGROUND OF THE INVENTION

1. Field of the Invention

The present invention relates to agricultural harvesters such as combines, and, more particularly, to sieves incorporated in the harvester crop processing section.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve or sieve are discharged at the rear of the combine. Grain falling through the lower sieve lands on a bottom pan of the cleaning system, where it is conveyed forwardly toward a clean grain auger.

The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

The upper sieve is driven for fore and aft movement to move the harvested crop material in an aft direction but at the same time separate the remaining grain or crop from the non-crop material. The sieve presents a significant weight having inertia forces that require structurally strong supports to secure the sieve in the agricultural frame but at the same time enable driven fore and aft movement. A further complication arises in that, when the agricultural harvester is on the side of a slope, it requires side to side movement of the sieve so as to prevent clogging of the material and resultant reduction in efficiency. The side to side movement is used generally selectively so that the continuous primary movement is fore and aft but the structural connection must also permit side to side movement of the sieve.

Accordingly, what is needed in the art is a sieve support that is structurally sound to drive the sieve in a fore and aft oscillation and at the same time permit side to side movement of the pan.

SUMMARY OF THE INVENTION

The present invention seeks to support a sieve in a structurally sound manner and allow it to be driven in a fore and aft direction but at the same time permit side to side movement.

In one form, the invention is a sieve for an agricultural harvester. The sieve includes a right frame and a left frame interconnected by at least one cross frame. Supports are provided for one of the forward and rear ends of said right and left frames with the supports formed from first and second members having triangularly positioned mounting points, the first and second members being interconnected at two of the mounting points. The third mounting point on the first member is pivotally mounted to a fore and aft drive input for the sieve and the third mounting point for the second frame is pivotally mounted to the frames for driving fore and aft movement and permitting side to side movement. Supports are provided for said right and left frames at the end opposite the first and second members, permitting fore and aft movement and side to side movement In another form, the invention is an agricultural harvester with a main frame, a plurality of wheels for ground movement and grain processing equipment mounted in the frame. A sieve receives material from the grain processing equipment and includes a right frame and a left frame interconnected by a cross frame with the cross frame being positioned at the forward end of the right and left frames. Supports are provided for one of the forward and rear ends of said right and left frames with the supports formed from first and second members having triangularly positioned mounting points, the first and second members being interconnected at two of the mounting points. The third mounting point on the first member is pivotally mounted to a fore and aft drive input for the sieve and the third mounting point for the second frame is pivotally mounted to the frames for driving fore and aft movement and permitting side to side movement. Supports are provided for said right and left frames at the end opposite the first and second members, permitting fore and aft movement and side to side movement.

An advantage of the present invention is a structurally robust support for a sieve that drives fore and aft movement and permits side to side movement.

Another advantage of the present invention is a simplified structural interconnection for a sieve.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
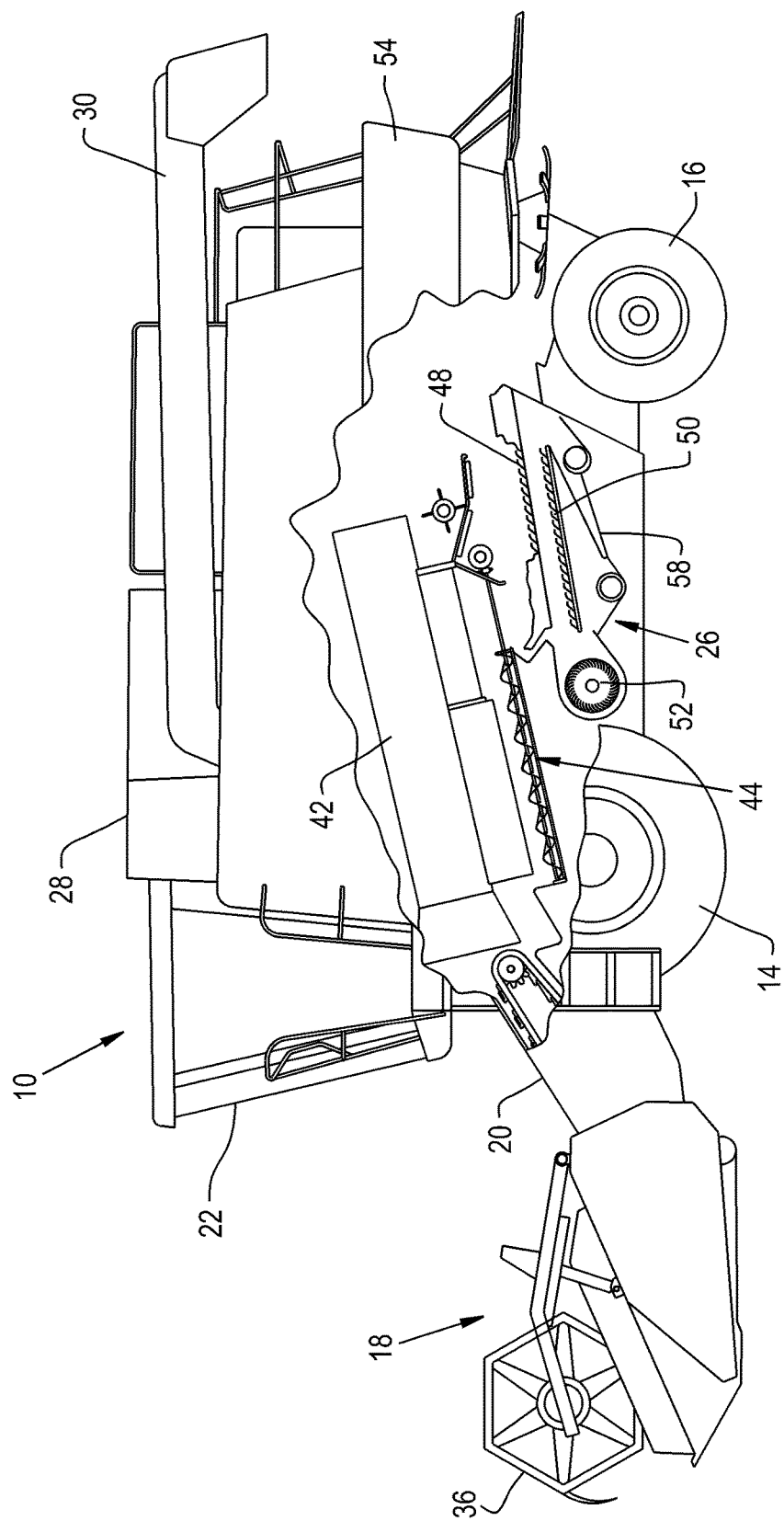
FIG. 1 is a side view of an embodiment of an agricultural harvester in the form of a combine which may include a sieve of the present invention.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine and a transmission (not shown). Although combine 10 is shown as including wheels, is also to be understood that combine 10 may include tracks, such as full tracks or half tracks.

Header 18 is mounted to the front of combine 10 and includes a cutter bar (not shown) for severing crops from a field during forward motion of combine 10. A rotatable reel 36 feeds the crop into header 18, and a double auger (not shown) feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor at least partially enclosed by and rotatable within a corresponding perforated concave 42. The cut crops are threshed and separated by the rotation of rotor within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 includes an upper sieve 48 (also known as a chaffer sieve), a lower sieve 50 (also known as a cleaning sieve), and a cleaning fan 52. Grain on sieves 48 and 50 is subjected to a cleaning action by fan 52 which provides an air flow through the sieves to remove chaff and other impurities such as dust from the grain by making this material airborne for discharge from straw hood 54 of combine 10. Grain pan 44 transports the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain passes through each sieve 48, 50 and from bottom pan 58 of cleaning system 26. The grain is passed laterally by an auger 52 to a generally vertically arranged grain elevator (not shown) for transport to grain tank 28. A pair of grain tank augers (not shown) at the bottom of grain tank 28 convey the clean grain laterally within grain tank 28 to unloading auger 30 for discharge from combine 10.

Figure 2:
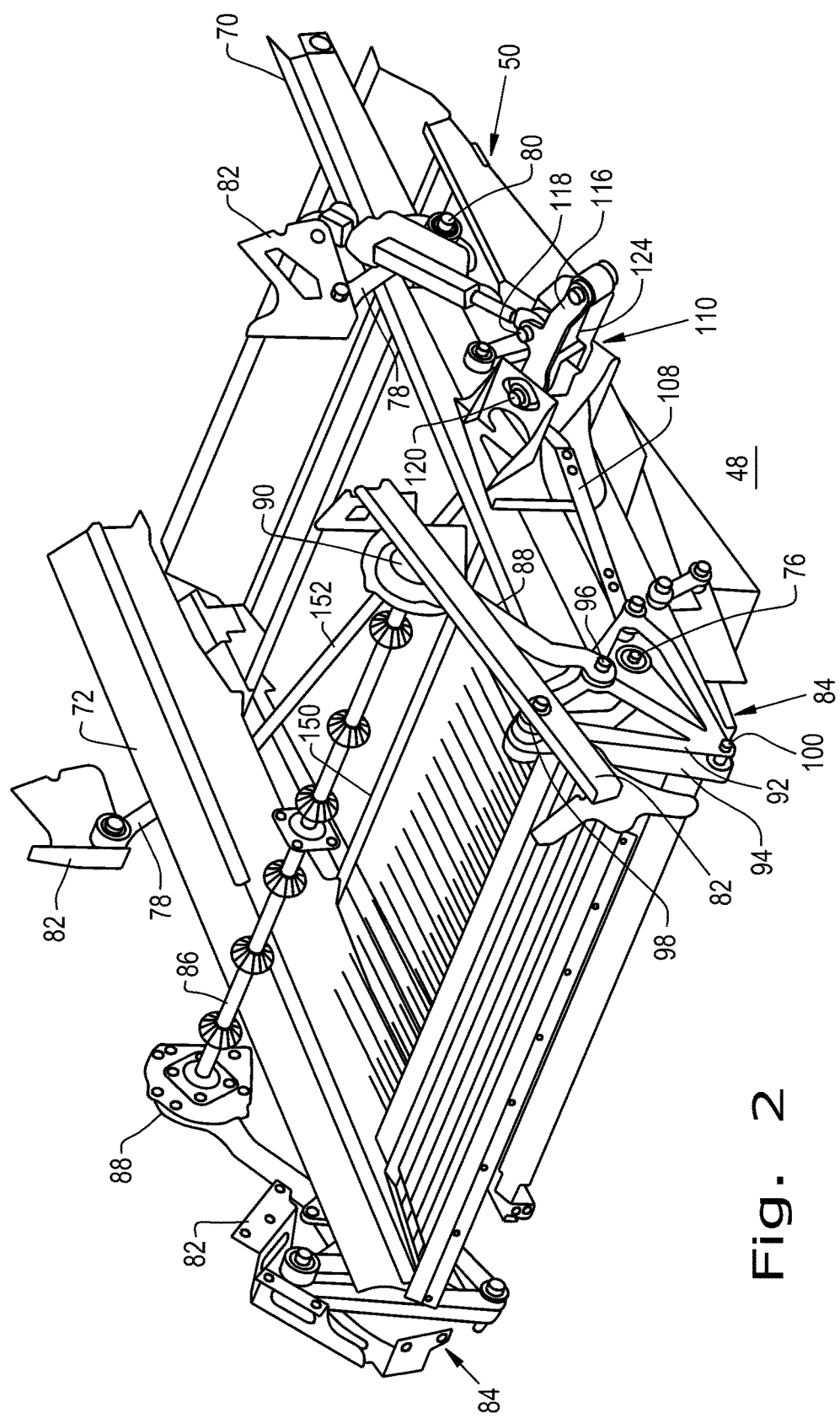
FIG. 2 is a perspective view of a sieve embodying the present invention.

Referring now to FIG. 2, the upper and lower sieves 48 and 50 are shown. The upper sieve 48 includes a left rail or frame 70 and a right rail or frame 72 interconnected by at least one cross frame 74. The left and right frames 70 and 72 are supported at the cross frame 74 by a front pivot support 76. A flexible rear link 78 connects to a rear support to maintain the rear of the rails in place. Support frames 82 provide a base affixed to the chassis 12 to provide ultimate support for the sieve 48. A sieve extends between right and left frames 70 and 72 to provide a surface for carrying material in an aft direction and permit grain or other crop material to drop through and be collected. The sieve is not shown to enable a clearer description of the present invention.

Figure 3:
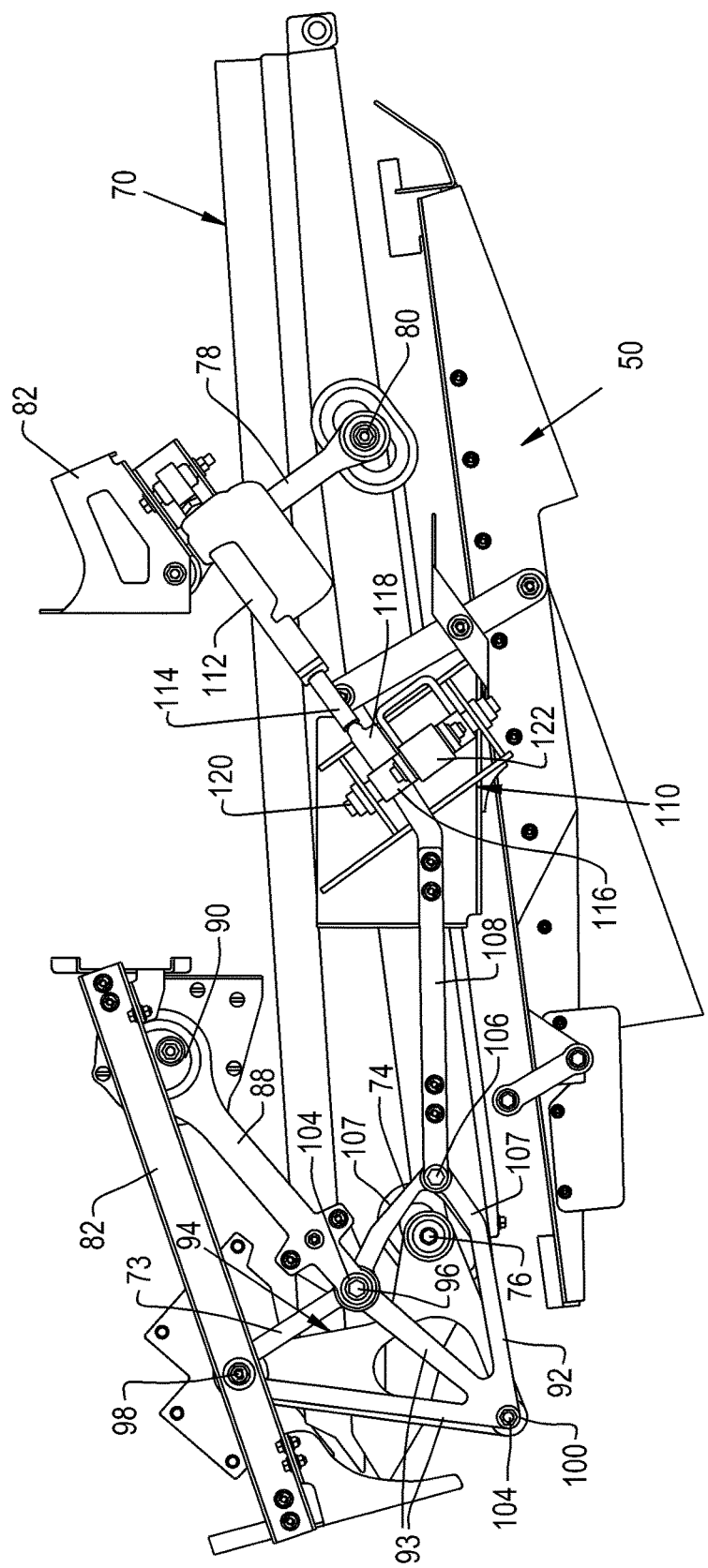
FIG. 3 is a side view of the sieve of FIG. 2.
Figure 4:
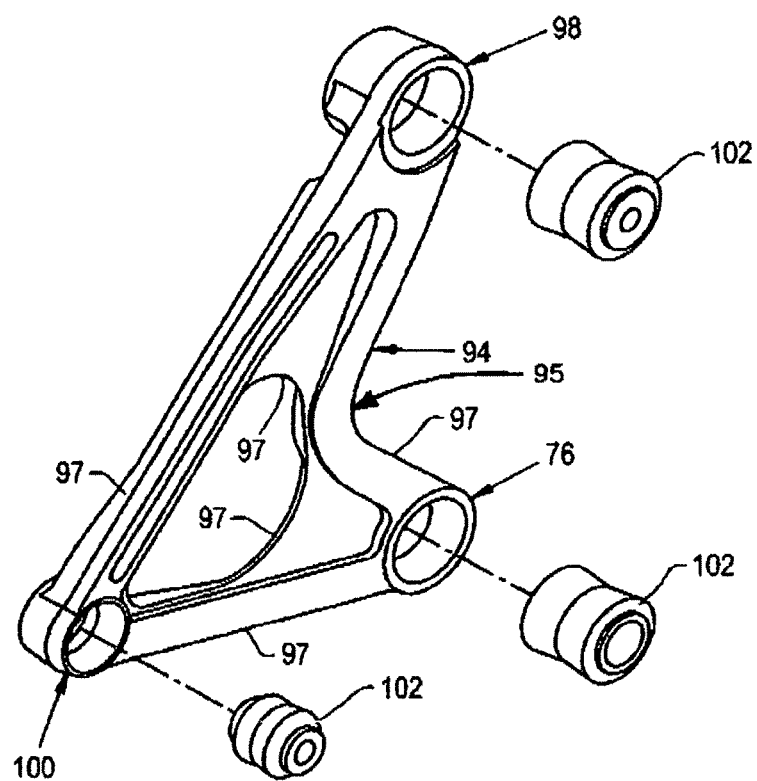
FIG. 4 is a detailed view of a support frame for the sieve of FIGS. 2 and 3.

The front of the right and left frames 70 and 72 are mounted for fore and aft movement through a fore and aft oscillation mechanism generally indicated at 84. An input drive shaft 86 extending transverse in chassis 12 receives a suitable power input for rotation. Both ends of drive shaft drive 86 reciprocate arm 88 through an eccentric mounting 90. Arm 88 connects to a first member 92 through a pivotal connection 96. A pivotal mounting 98 supported by frame 82 mounts the first member 92 and a second member 94 adjacent to it in radially inward from the first member 92. A frame interconnection 100 connects the first and second members 92 and 94. The second member 94 has a plurality of flexible rubber bushings 102 as shown particularly in FIG. 5. A plurality of rubber bushings 104, particularly shown in FIG. 3, enables an interconnection between the first and second members 92 and 94. As shown in FIGS. 2, 3 and 4, the pivotal connections 76 (second member 94), common pivotal interconnections 98, 100 and pivotal connection 96 (first member 92) form triangles with two sides common and the third independent. Also, the members 92 and 94 are formed generally as legs 93 and 95 connecting the pivotal mounting points, with one of the legs 95 being curved for clearance purposes. Webs 97 structurally reinforce the legs of member 94. Preferably, members 92 and 94 are cast.

A pivotal connection 106 on first member 92 through legs 107 (FIG. 3) connects with a link 108 that drives the lower sieve 50 for reciprocating movement. Details of this arrangement are not included to enable a better focus on the invention.

The right and left frames 70 and 72 are selectively reciprocated from side to side by a side shaker mechanism generally indicated at 110. The mechanism includes a reciprocating electric actuator 112 appropriately mounted to frame 82 and having an output shaft 114 connecting to upper and lower links 116 by a pivotal input connection 118. The upper and lower links 116 are pivotally connected to the frame 82 at 120. A bushing 122, integral with a connecting rod 124 connects the links 116. The connecting rod 124 extends to a structural connection, (not shown) for tying the right frame 72 and left frame 70 together for side to side movement.

The members 92 and 94 are preferably castings with the structural mounting points interconnected by legs of a triangle for producing a robust interconnection having a minimum of weight. The webs 97 in the second member 94 provide additional structural integrity with a minimum of additional weight. By interconnecting the members 92 and 94 at two forward points and providing the pivotal support 98 for the first and second members 92, 94 to the mainframe elements 82 and the front pivotal support for the right and left side frames behind, sufficient side to side movement is permitted without a bulky overall envelope for the forward sieve support. The mechanism also permits a minimum width to allow a maximum width for the sieve enabling efficient processing of the grain. The rubber bushings 102 and 104 enable a secure but flexible connection between the first and second members 92 and 94.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sieve assembly for an agricultural harvester, said sieve assembly comprising:
    a sieve surface supported between a right frame and a left frame that are interconnected by at least one cross frame;
    first supports for one of a forward end and a rear end of said right and left frames, said supports comprising first and second members having triangularly positioned mounting points, said first and second members being interconnected at two of said mounting points, said third mounting point on said first member being pivotally mounted to an end frame support for said sieve, and said third mounting point for said second member being pivotally mounted to said right and left frames for driving fore and aft movement and permitting side to side movement; and
    second frame supports for said right and left frames at said end opposite said first and second members, permitting fore and aft movement and side to side movement;
    wherein said second member is connected to said right and left frames at said cross frame.

2. The sieve assembly as claimed in claim 1, further comprising rubber bushings interconnecting said first and second members at least at the two mounting points mutually interconnecting the frames.

3. The sieve assembly as claimed in claim 1, wherein said first and second members are at least partially formed from legs of a triangle interconnecting said triangular mounting points.

4. The sieve assembly as claimed in claim 3, wherein said first and second members are cast.

5. The assembly sieve as claimed in claim 3, wherein said first member has a further support point for driving a mechanism for reciprocating movement.

6. The sieve assembly as claimed in claim 5, wherein said further support comprises legs of a triangle.

7. The sieve assembly as claimed in claim 1, wherein the common mounting points for said first and second members are forward of said third mounting points.

8. A sieve assembly for an agricultural harvester, said sieve comprising:
    a right frame and a left frame interconnected by at least one cross frame;
    first supports for one of a forward end and a rear end of said right and left frames, said first supports comprising first and second members having triangularly positioned mounting points, the first and second members being interconnected at two of the mounting points, the third mounting point on said first member being pivotally mounted to a support for said sieve, and the third mounting point for said second member being pivotally mounted to said right and left frames for driving fore and aft movement and permitting side to side movement; and,
    second supports for said right and left frames at the end opposite the first and second members, permitting fore and aft movement and side to side movement;
    wherein said first and second members are at least partially formed from legs of a triangle interconnecting said triangular mounting points
    wherein said first and second members are cast;
    wherein said second member has integral structural webs reinforcing said triangular legs.

9. An agricultural harvester comprising:
    a chassis;
    grain processing equipment mounted in said chassis and including a main sieve for movement of chaff to a discharge end;
    a sieve comprising a right frame and a left frame interconnected by at least one cross frame;
    first supports for one of a forward end and a rear end of said right and left frames, said supports comprising first and second members having triangularly positioned mounting points, said first and second members being interconnected at two of said mounting points, said third mounting point on said first member being pivotally mounted to a support for said sieve, and said third mounting point for said second frame being pivotally mounted to said right and left frames for driving fore and aft movement and permitting side to side movement; and second supports for said right and left frames at said end opposite said first and second members, permitting fore and aft movement and side to side movement;

wherein said first and second members are pivotally connected to said chassis at one of said common interconnection points between said first and second member for pivotal motion with respect to the chassis.

10. The agricultural harvester as claimed in claim 9, further comprising a mechanism supported by said chassis for driving the first member of said supports into fore and aft oscillation.

11. The agricultural harvester as claimed in claim 10, wherein said oscillating mechanism comprises a link connected to said third mounting point on said first member and an eccentric mechanism for driving said link in a fore and aft direction.

12. The agricultural harvester as claimed in claim 9, wherein said common interconnection points between said members are forward of said first of said third mounting points with respect to a direction of the flow of crop material over said sieve.

13. The agricultural harvester as claimed in claim 12, wherein said common point mounting points are upper and lower points, said pivotal mounting to said chassis is at the upper mounting point.

14. The agricultural harvester as claimed in claim 9, wherein said first and second members are formed from legs of a triangle, said legs interconnecting said triangularly positioned mounting points.

15. The agricultural harvester as claimed in claim 14, wherein said first and second members are cast.

16. The agricultural harvester as claimed in claim 15, wherein said second member has integral webs reinforcing said legs.

* * * * *